(12) United States Patent
Winnington et al.

(10) Patent No.: US 6,290,216 B1
(45) Date of Patent: Sep. 18, 2001

(54) ROTARY HEAT AND/OR MASS TRANSFER ARRANGEMENTS

(75) Inventors: Terence Leslie Winnington, Stroud; Robert Lorton, Cheltenham, both of (GB)

(73) Assignee: Interotex Limited, Glorcestershire (GB)

( * ) Notice: Subject to any disclaimer, the term of this patent is extended or adjusted under 35 U.S.C. 154(b) by 0 days.

(21) Appl. No.: 09/381,834

(22) PCT Filed: Apr. 20, 1998

(86) PCT No.: PCT/GB98/00946

§ 371 Date: Sep. 24, 1999

§ 102(e) Date: Sep. 24, 1999

(87) PCT Pub. No.: WO98/47592

PCT Pub. Date: Oct. 29, 1998

(30) Foreign Application Priority Data

Apr. 19, 1997 (GB) ................................................ 9707948

(51) Int. Cl.⁷ ...................................................... B01F 3/04
(52) U.S. Cl. ................................................ 261/89; 261/90
(58) Field of Search ........................................ 261/90, 89

(56) References Cited

U.S. PATENT DOCUMENTS

| | | | |
|---|---|---|---|
| 787,454 | * 4/1905 | Kelly | 261/90 |
| 838,951 | * 12/1906 | Comins | 261/90 |
| 923,855 | * 6/1909 | Kestner | 261/90 |
| 976,081 | * 11/1910 | Kinealy | 261/90 |
| 1,139,385 | * 5/1915 | Theisen | 261/90 |
| 1,218,354 | * 3/1917 | Baldwin | 261/90 |
| 1,501,515 | 7/1924 | Testrup . | |
| 1,871,022 | * 8/1932 | Zellweger | 261/90 |
| 2,399,108 | * 4/1946 | Feinberg | 261/90 |
| 3,348,363 | * 10/1967 | King, Jr. et al. | 261/90 |
| 3,890,205 | 6/1975 | Schnitzer . | |
| 4,223,539 | 9/1980 | Webb et al. . | |
| 4,597,835 | 7/1986 | Moss . | |
| 5,009,085 | * 4/1991 | Ramshaw et al. | 62/476 |
| 5,411,640 | 5/1995 | Ramsland . | |
| 5,467,613 | 11/1995 | Brasz . | |

FOREIGN PATENT DOCUMENTS

| | | | |
|---|---|---|---|
| 2 506 443 | 11/1982 | (FR) . | |
| 757085 | 9/1956 | (GB) . | |
| 835055 | 5/1960 | (GB) . | |
| 2 241 774 | 9/1991 | (GB) . | |
| 36114 | * 3/1935 | (NL) | 261/90 |
| 576495 | * 10/1977 | (SU) | 261/90 |

* cited by examiner

Primary Examiner—C. Scott Bushey
(74) Attorney, Agent, or Firm—Young & Thompson

(57) ABSTRACT

A rotary heat and/or mass transfer arrangement in which a liquid component undergoes heat and/or mass transfer with a vapor component includes a rotor 10 on which a layer of fluid is applied by nozzles 16. The flow across the rotor is actively disturbed by a radial row of nozzles 20, to enhance the heat and/or mass transfer coefficients.

10 Claims, 1 Drawing Sheet

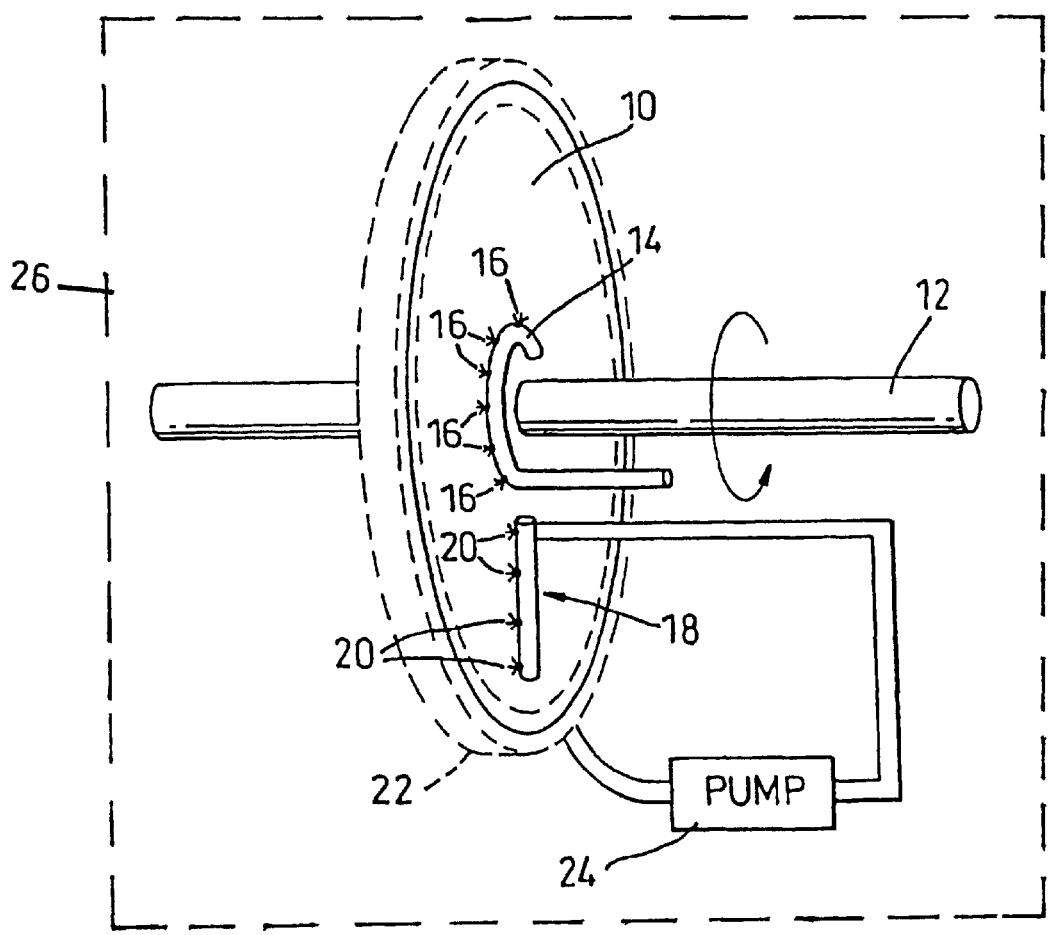

ROTARY HEAT AND/OR MASS TRANSFER ARRANGEMENTS

This invention relates to rotary heat and/or mass transfer arrangements.

In particular, though not exclusively, the invention is concerned with heat/mass transfer enhancements in apparatus which makes use of process intensification, for example in a rotary absorption heat pumps. Examples of such pumps are disclosed in U.S. Pat. No. 5,009,085 and our co-pending International Patent Application No. PCT/GB96/02486, the entire contents of which are incorporated herein by reference. In such apparatus it is common to make use of rotating surfaces to provide thin films for the transference of heat and mass. For example, in one region of a typical rotary absorption heat pump, a stream of a working mixture which is rich in a volatile component is directed onto a radially inner surface of a rotating generator wall through a single outlet pipe, the other side of the wall receiving heat from a gas burner.

To provide an acceptable cycle efficiency it is extremely important to maximise the heat and mass transfer from the generator wall. Earlier work in this field, (for example Cross, W. T. and Ramshaw, C. Process Intensification: Laminar Flow Heat Transfer. Chem. Eng. Res. Des., Vol. 64, pp 293–301) indicates that, theoretically, heat and mass transfer coefficients in laminar flow situations can be equivalent to or better than their turbulent counterparts and so it would be expected that laminar flow should be maintained. Surprisingly we have found that, by redesign of the system, it is possible to achieve far greater heat and mass transfer rates, by deliberately disturbing the fluid film, e.g. by wave generation or wake interaction.

Accordingly, in one aspect of this invention, there is provided a rotary heat and/or mass transfer arrangement, comprising:

a rotor means for being rotated in use;

means for delivering a supply of liquid to a radially inner region of a surface of said rotor to provide a fluid film which flows over said surface accompanied by heat and/or mass transfer to or from said liquid, and means for disturbing said flow, thereby to enhance at least one of said heat and mass transfer.

We have found that by disturbing the flow, the heat and mass transfer coefficients may be increased. Generally we have found that the disturbance creates waves or a wake interaction which enhance mass and heat transfer.

This arrangement is particularly appropriate where a liquid/vapour interaction occurs at the exposed surface of said liquid, for example the absorption of vapour into the liquid, the giving off vapour from the liquid, or chemical absorption or chemical reactions at the surface thereof.

Preferably, said delivering means comprises a plurality of nozzle means disposed around the rotary axis of said rotor, to provide in use a film thickness in which the non-uniformities are reduced compared to those generated by rise of a single delivery nozzle means. We believe that the combination of a substantially uniform film thickness applied by the plurality of nozzle means, and suitable disturbance of the flow either by a main nozzle means, or by a recirculating nozzle means, can increase the heat transfer coefficient by up to 2, and the mass transfer coefficient by up to 2. The plurality of nozzle means may in certain embodiments also constitute the means for disturbing said flow. Thus by suitable location and direction of the liquid jets, a wave generation or wave interaction effect may be set up. For a recirculating arrangement, flow leaving the rotor means may be collected and recirculated to be directed back on to the rotor by means of one or more disturbing nozzle means directed towards the surface of said rotor means. Preferably, a plurality of additional nozzle means are directed at different radial positions thereby to provide a re-stirring of the film and consequently mixing of concentration and temperature profiles within the film for each complete revolution of the rotor. In this way, the local heat and mass transfer rates may be increased.

These arrangements may be applied to any of the "rotating disc" processes within a rotary absorption heat pump.

Accordingly, in another aspect, this invention extends to a rotary absorption heat pump incorporating one or more rotary heat and/or mass transfer arrangements as described above.

We have found that the cycle efficiency of the heat pump can be substantially enhanced by using these arrangements.

In another aspect, there is provided a method of enhancing the heat or mass transfer coefficient in a rotary system comprising a rotor over which liquid is required to flow in use accompanied by heat and/or mass transfer to or from said liquid, said method comprising disturbing said flow, thereby to cause at least partial re-stirring and/or re-mixing of liquid within said flow.

In another aspect, the invention extends to a rotary heat and/or mass transfer arrangement comprising:

a rotor for being rotated in use;

means for delivering a supply of liquid to a radially inner region of a surface of said rotor to flow in use over said surface accompanied by heat and/or mass transfer to or from said liquid, wherein said means for delivering comprises a plurality of nozzle means disposed about the rotary axis of said rotor adapted to provide a non-laminar flow of fluid across said rotor.

Whilst the invention has been described above it extends to any inventive combination of the features set out above or in the following description.

The invention may be performed in various ways, and, by way of example only, an embodiment thereof will now be described in detail, reference being made to the accompanying drawing, in which:

The FIGURE is a schematic view of a rotary heat and/or mass transfer arrangement.

Referring to the FIGURE, the arrangement comprises a rotor or disc 10 mounted on a shaft 12 for rotation about the shaft axis. The rotor 10 may typically be a generator wall in a rotary absorption heat pump arrangement 26 of the types described in U.S. Pat. No. 5,009,085 or in our copending International Patent Application PCT/GB96/02486. In such arrangements it is important to maximise the heat transfer between the rotor and the thin film of fluid flowing over it, and also the mass transfer of vapour from the liquid film. In the illustrated arrangement, the primary flow of fluid to the surface is supplied to a collar 14 having a plurality of nozzles 16 equi-angularly disposed about the rotary axis of the rotor 12. The nozzles 16 are designed to distribute the flow substantially evenly about the inner radial portion of the rotor so that a film of substantially uniform thickness to be set up, but also to impart by the jet action of the nozzles to the formed liquid film a wave or wake interaction effect to cause mixing and stirring of the film and thus to enhance its heat and mass transfer coefficients.

The system also includes an arrangement for directing a recirculating flow of fluid to the surface of the rotor 10 through a linear arrangement 18 of jets 20 applied at differing radial positions. On leaving the radially outer edge of the rotor, at least part of the liquid is collected in a sump ring 22, by a pump 24 and pumped to the jets 20.

As well as producing an uniform application of fluid the method also provides a re-stirring of the film and consequent re-mixing of concentration and temperature profiles within the film each complete revolution of the rotor.

This type of arrangement is particularly applicable when using high viscosity fluids as found in rotary absorption heat pumps (typically 1 to 30 centipoise) which behave in a highly laminar manner and which are not highly stirred within the film thickness. Without the modifications of the present invention, the laminar jet flow would produce a situation where the concentration and temperatures profiles within the liquid film would dominate the transfer rates.

By way of example, the typical rotational speed of the rotor in a typical rotary absorption heat pump would be up to 1000 rpm with liquid flow rates of between 10 and 100 grams per second, over the surface of a rotor of typically 50 cm in diameter.

What is claimed is:

1. A rotary arrangement for providing at least one of heat transfer and mass transfer between a fluid on a rotor and the environment within which it rotates in use, said arrangement comprising:

a rotor for being rotated in use about a rotary axis and defining a transfer surface extending generally transversely relative to said axis, and which is angularly continuous around said axis, and a liquid source for delivering a supply of liquid to a radially inner region of said transfer surface of said rotor to provide a liquid film which flows over said transfer surface accompanied by at least one of heat and mass transfer to or from said liquid, said liquid source including at least one fluid jet nozzle for disturbing said flow, thereby to enhance at least one of said heat and mass transfer.

2. A rotary arrangement according to claim 1, wherein said liquid source comprises a plurality of delivery nozzles disposed around said rotary axis, to provide in use a film of substantially uniform thickness.

3. A rotary arrangement according to claim 2, wherein said liquid source comprises a common pipe or conduit for supplying fluid to each of said nozzles.

4. A rotary arrangement according to claim 1, wherein said at least one fluid jet nozzle comprises at least one fluid jet nozzle disposed radially outwardly of said radially inner region.

5. A rotary arrangement according to claim 4, including a collector for collecting fluid passing from said rotor and for supplying it to said at least one fluid jet nozzle.

6. A rotary arrangement according to claim 2, wherein one or more of said delivery nozzles is adapted in use to produce a fluid jet which impinges to cause a non-laminar wave generation or wake interaction in said fluid film, thereby to enhance at least one of said heat and mass transfer.

7. A rotary heat pump incorporating one or more rotary arrangements according to claim 1.

8. A method of enhancing at least one of the heat or mass transfer coefficient in a rotary system comprising a rotor having a rotary axis and a transfer surface extending generally transversely relative to said axis and which is angularly continuous around said axis, and over which liquid is required to flow in use accompanied by at least one of heat and mass transfer to or from said liquid, said method comprising supplying said liquid to a radially inner region of said transfer surface to provide a fluid film which flows over said transfer surface, and using at least one fluid jet to disturb said liquid film to provide a mixed or stirred flow.

9. A rotary heat and/or mass transfer arrangement comprising:

a rotor for being rotated in use about a rotary axis and having a transfer surface which extends generally transversely relative to said axis and which is angularly continuous around said axis;

a liquid source for delivering a supply of liquid to a radially inner region of said transfer surface to provide a liquid film which flows in use over said transfer surface accompanied by at least one of heat and mass transfer to or from said liquid, wherein said liquid source comprises a plurality of nozzles disposed about the rotary axis of said rotor, with one or more of said nozzles being adapted in use to direct a fluid jet which impinges said liquid film to provide a mixed or stirred flow of liquid across said rotor.

10. A two phase, liquid/vapour system in which in use a liquid component undergoes mass and heat transfer with a vapour component, said system comprising:

a rotor for being rotated in use about an axis and having a transfer surface which extends generally transversely relative to said axis and which is angularly continuous around said axis;

a liquid source for delivering a supply of liquid to a radially inner region of a surface of said rotor to provide a film which flows over said surface accompanied by at least one of heat and mass transfer to or from said liquid, and one or more fluid jets for disturbing said flow, thereby to enhance at least one of said heat and mass transfer.

* * * * *